Dec. 6, 1960 J. PETRO 2,963,199
APPARATUS FOR LOADING LEAD WIRES INTO
AN AUTOMATIC STEM-MAKING MACHINE
Filed Dec. 23, 1954 7 Sheets-Sheet 1
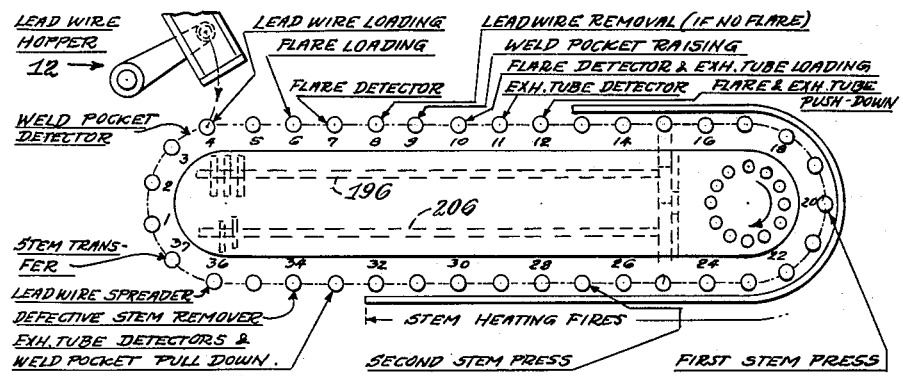
Fig. 1.
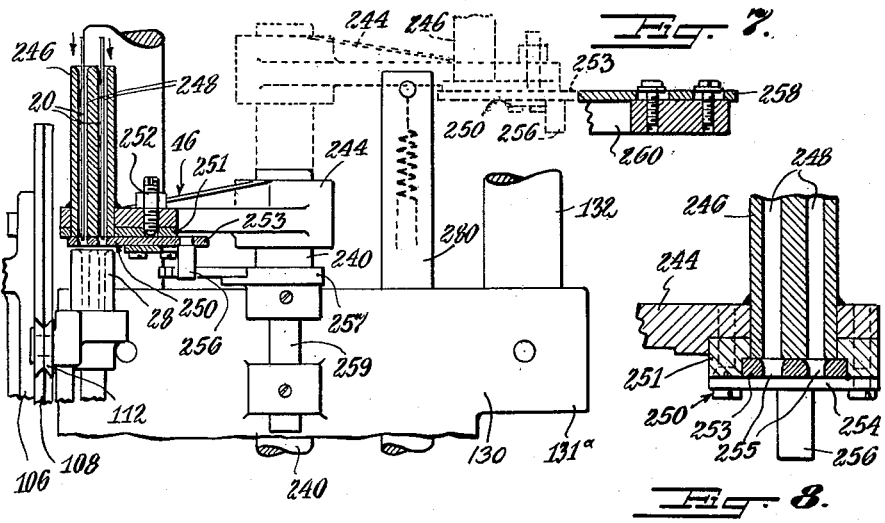
Fig. 7.
Fig. 8.
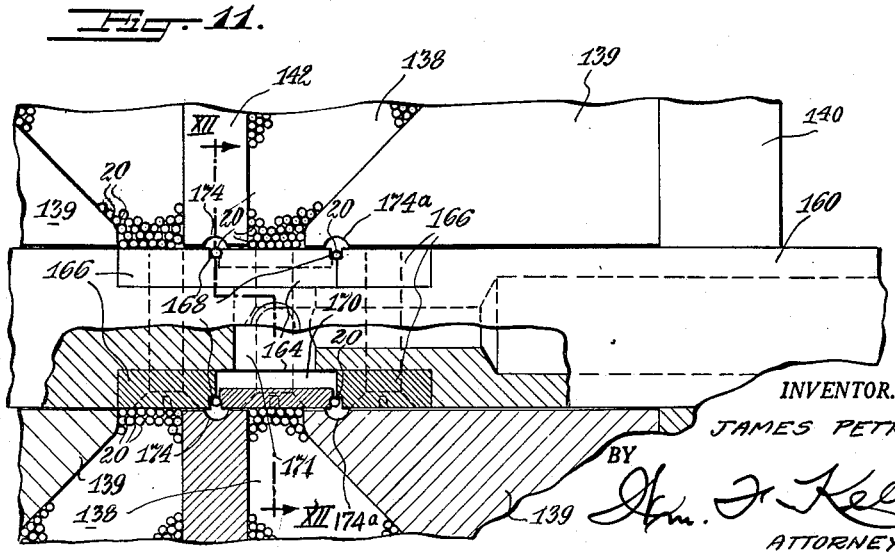
Fig. 11.
INVENTOR.
JAMES PETRO
BY
ATTORNEY

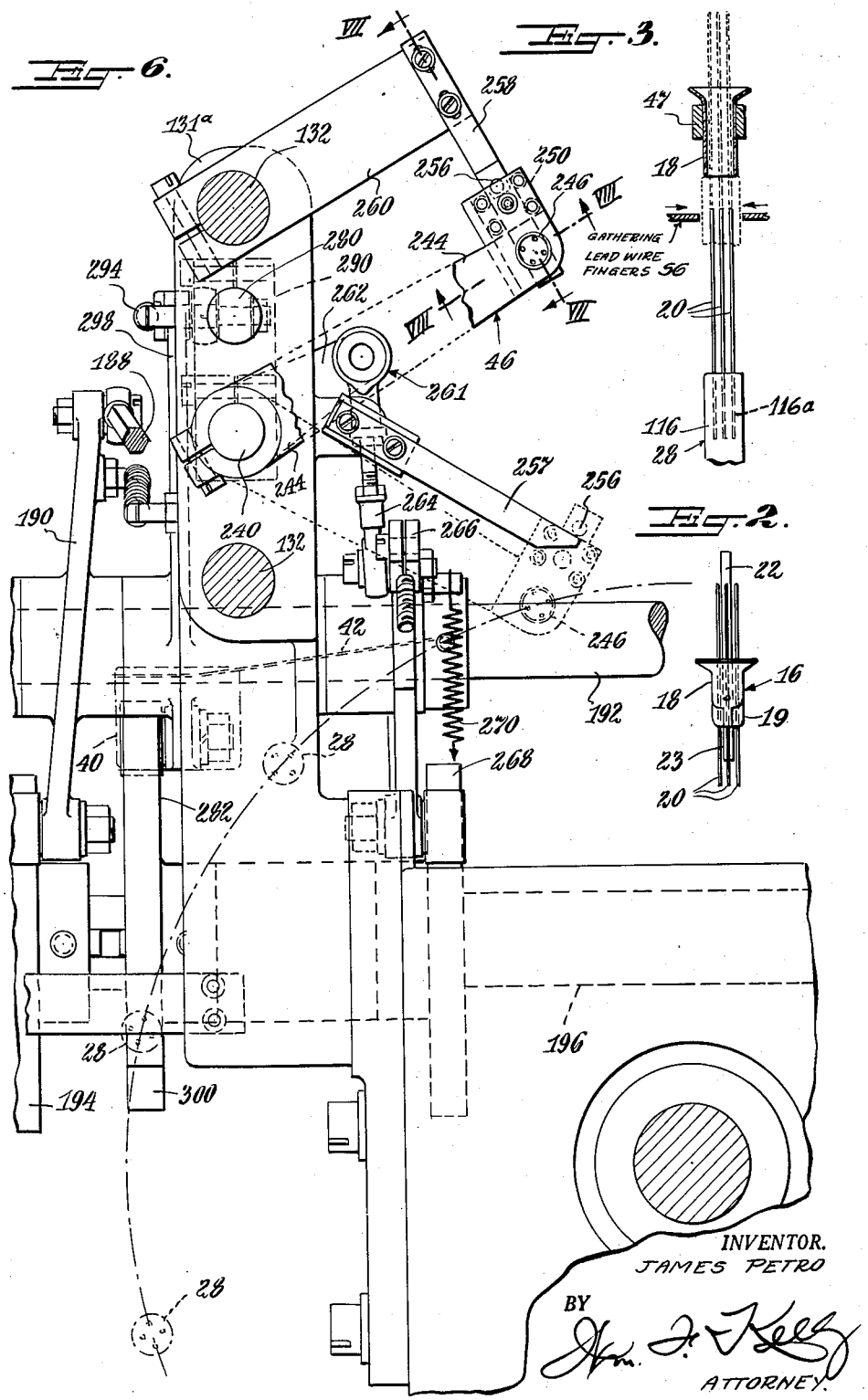

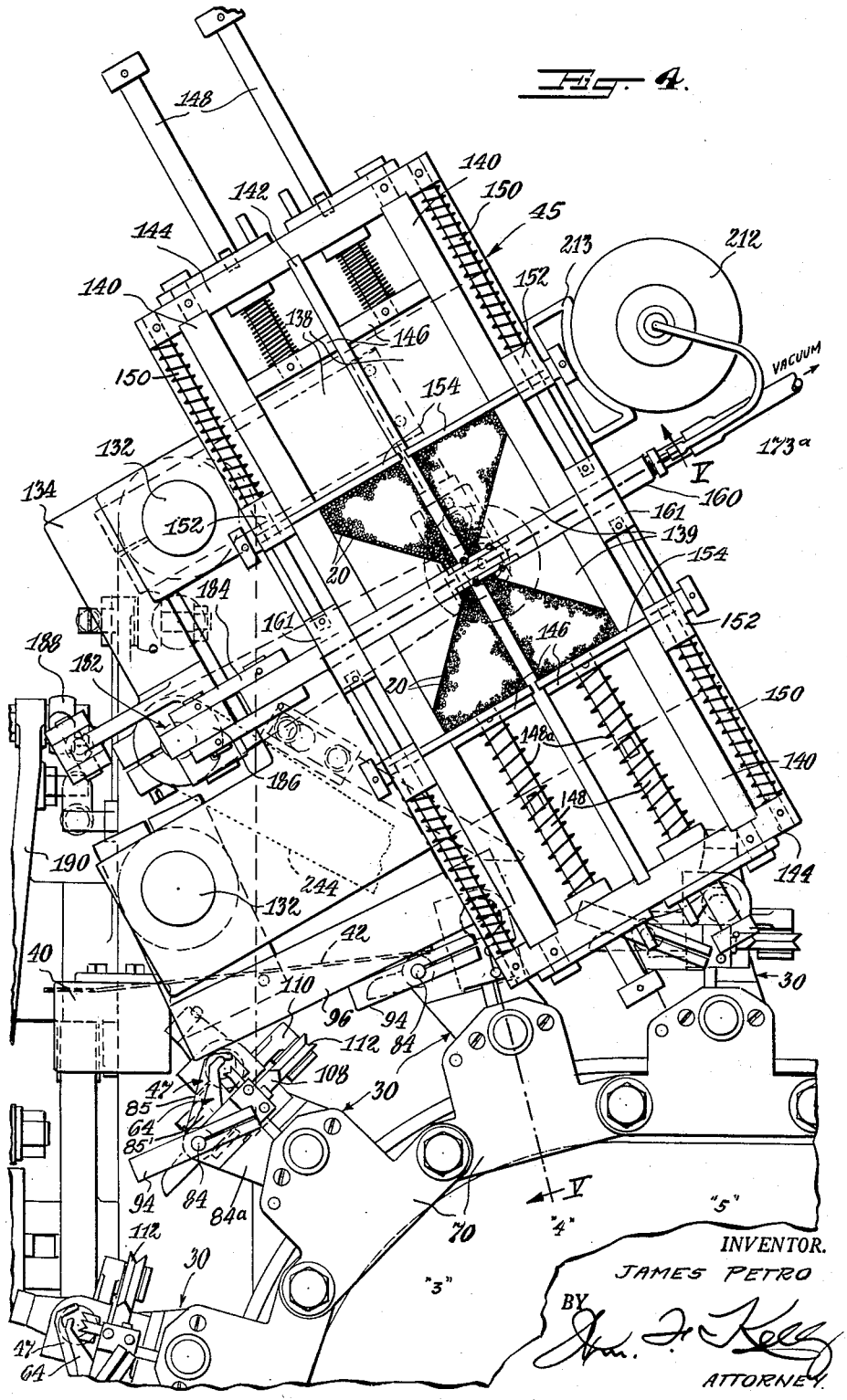

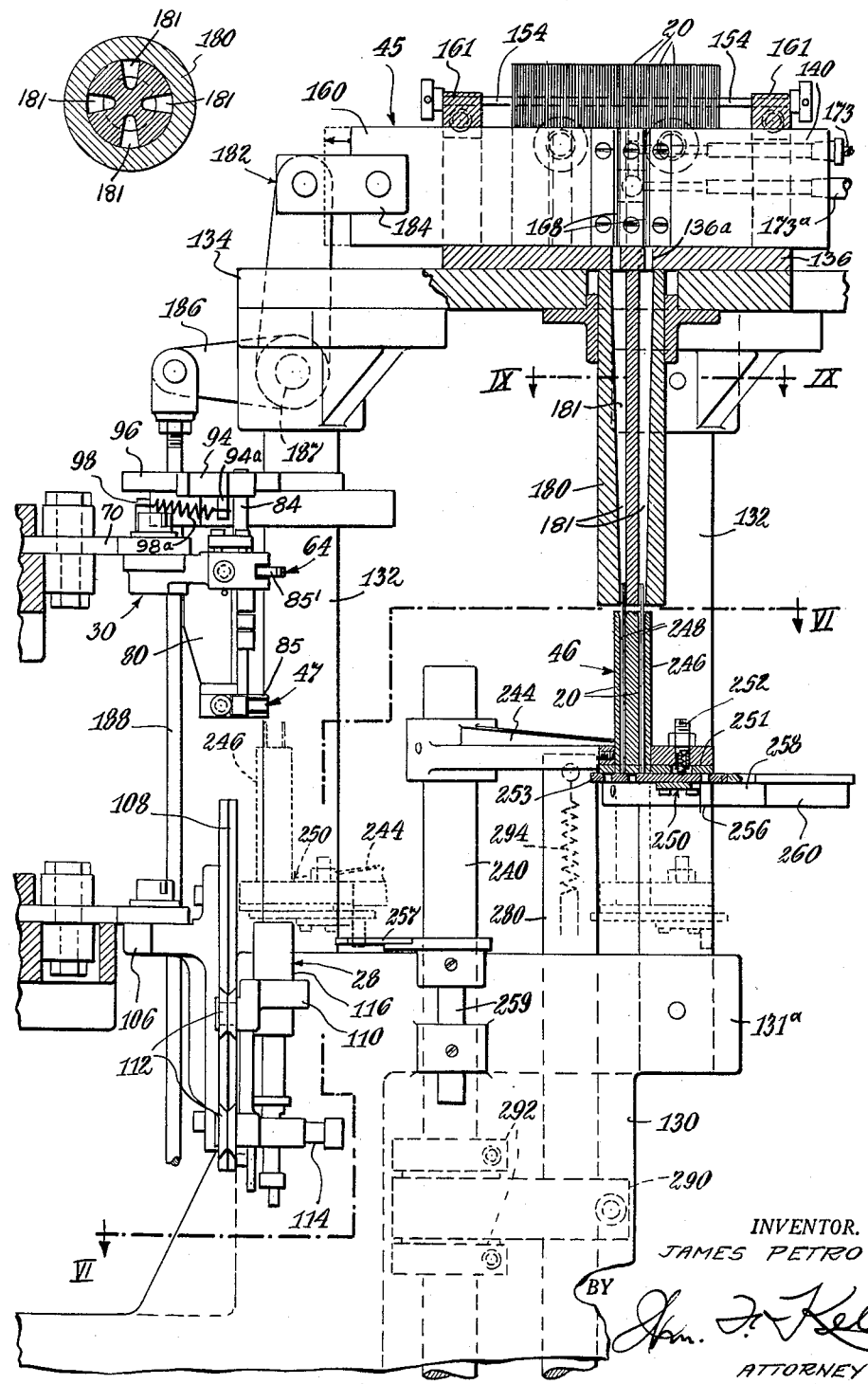

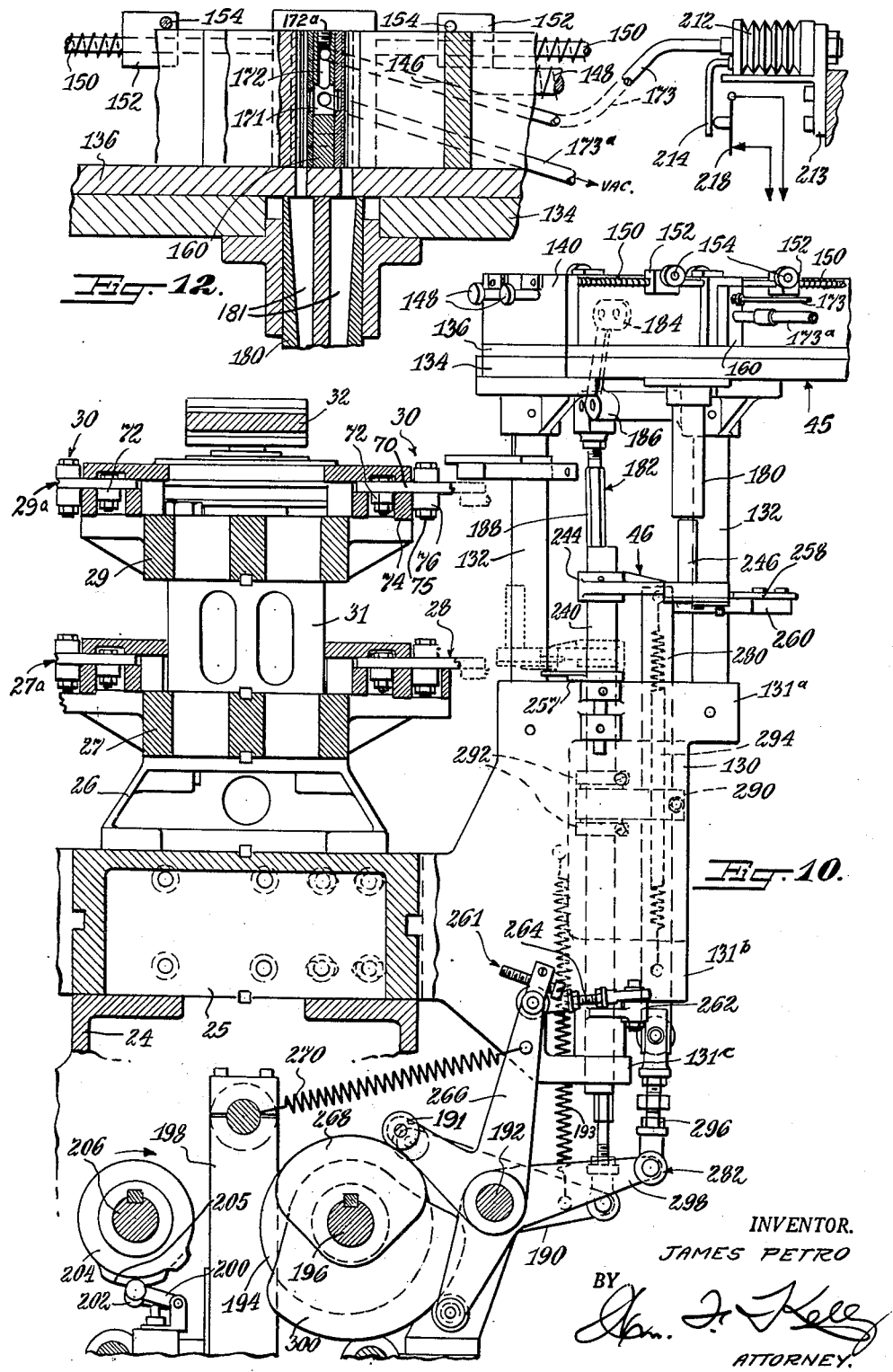

Dec. 6, 1960
J. PETRO
2,963,199
APPARATUS FOR LOADING LEAD WIRES INTO AN AUTOMATIC STEM-MAKING MACHINE
Filed Dec. 23, 1954
7 Sheets-Sheet 6
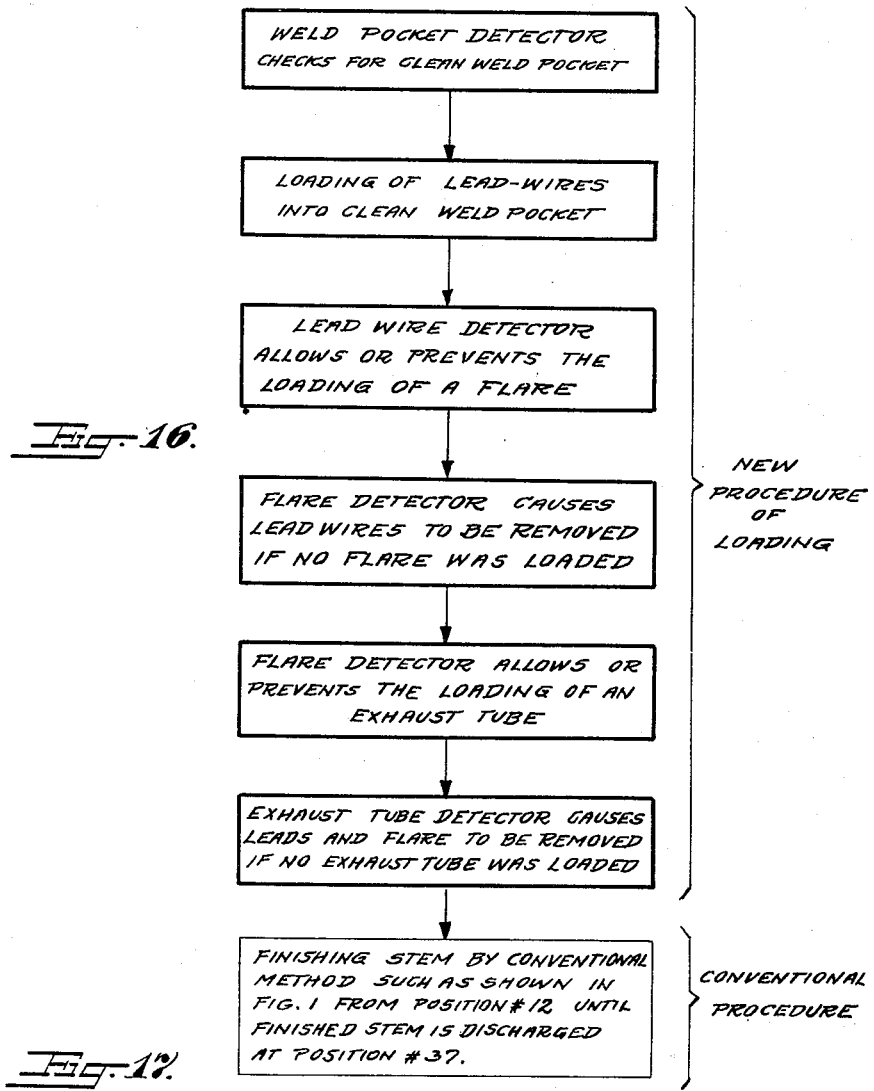
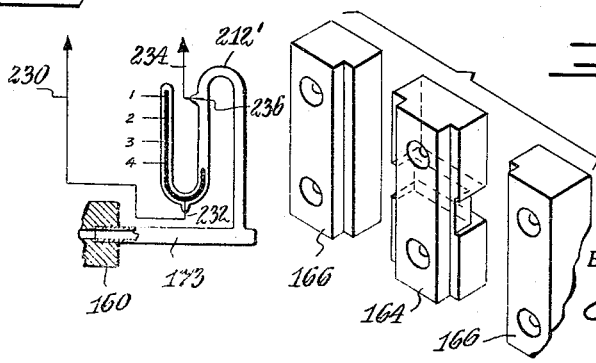
INVENTOR.
JAMES PETRO
BY
ATTORNEY.

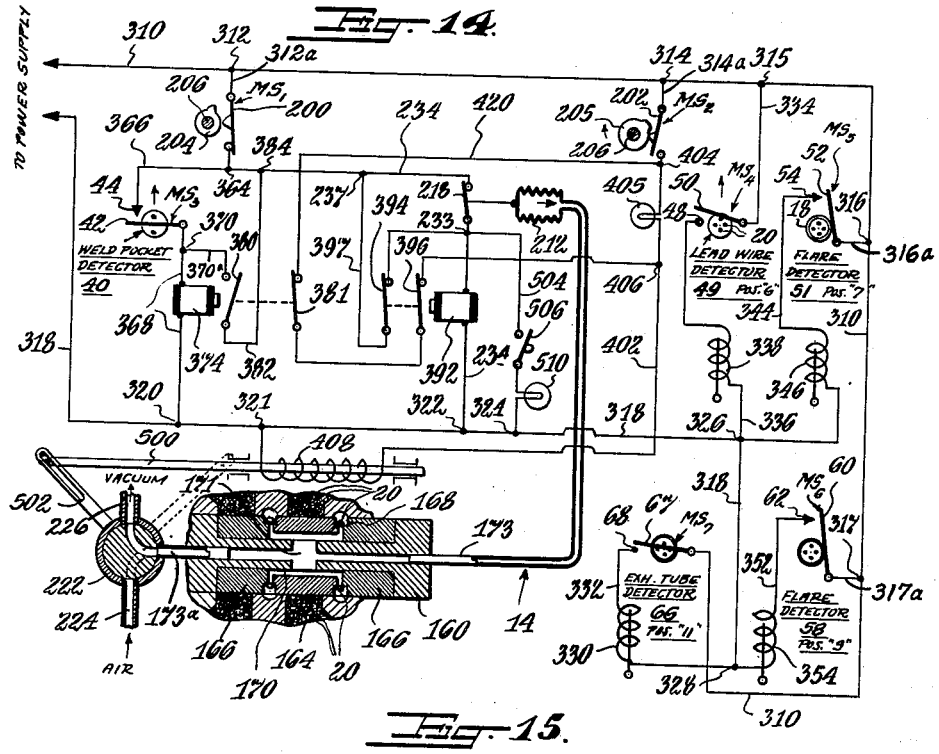
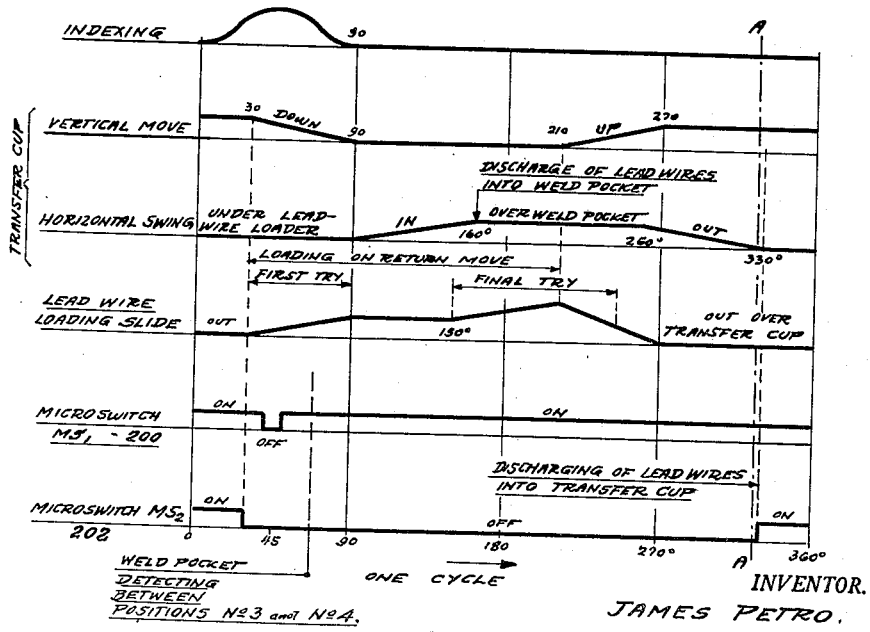

2,963,199

APPARATUS FOR LOADING LEAD WIRES INTO AN AUTOMATIC STEM-MAKING MACHINE

James Petro, Little Falls, N.J., assignor to Westinghouse Electric Corporation, East Pittsburgh, Pa., a corporation of Pennsylvania Filed Dec. 23, 1954, Ser. No. 477,329

5 Claims. (Cl. 221—13)

The present invention relates to automatic stem making machines and, more particularly, to a method of, and apparatus for loading lead wires into such machines.

I am aware of U.S. Patent 2,637,144, entitled "Automatic Lamp Stem Fabricating Apparatus," issued to R. M. Gardner et al., on May 5, 1953 and assigned to the Sylvania Electric Products Inc. In such a machine the number of lead wires to be loaded into a head thereof may be fed individually at separate stations. The devices usually employed to detect lead wires in a head of such a machine generally have mechanically operated scissor-like detector fingers carrying electrical contacts. These contacts of the mechanical detectors are usually employed to close an electrical circuit which signals the absence of one or more leads and prevents the loading of an exhaust tube or flare, depending on the operating sequence of the stem machine.

Checking the presence of a complete set of leads in the weld pocket of a head of a stem machine is a difficult undertaking for a mechanically driven detector. When, for example, the leads are located in close proximity to each other it is well nigh impossible to construct a mechanical detector of this type to detect simultaneously the complete set of leads, without resorting to a complicated mechanism having a plurality of interfering and cooperating mechanical detecting fingers. Again, if the leads are long and flimsy in nature such a mechanical detector, operating within the small operating range of approximately .010 to .015" (commonly the diameter of such leads), will often fail to function properly due to deformation of the leads at work stations prior to the detecting stations.

Stem making machines of the conventional type employ a stem parts loading method comprising; first loading a flare into the flare holding jaws at one station; detecting the flare at the next station; loading the lead wires, one at a time at successive stations; detecting the lead wires at a succeeding station; and feeding an exhaust tube into the exhaust tube holder at a further work station. Detecting the presence of a flare is a simple task for a mechanical detector. However, as mentioned above, detecting the presence of a complete set of leads (prior to the feeding of an exhaust tube) with such mechanical detectors is unsatisfactory. With this conventional method of loading the parts into a stem machine, a defective stem results if the lead wire detector fails in its assignment. No provision is made for the detection during delivery of a complete set of leads at one time at one station.

Hence, it has been found advantageous according to the invention to provide a method of and apparatus for loading a full set of leads at one time at one station of a stem machine. The number of leads, it will be understood, which may be loaded is not restricted and may comprise any desired amount. The invention also employs a novel vacuum operated lead wire detector which eliminates the need for mechanical detecting fingers.

The apparatus of the invention for feeding lead wires to the weld pocket of a stem making machine comprises a plurality of lead wire hoppers for supplying the required number of lead wires individually, a lead wire loader or slide assembly for selecting and segregating the desired number of lead wires, a vacuum type detector for detecting the presence of a full set of lead wires and a transfer cup assembly for delivering a full set of lead wires to the weld pocket.

The lead wire loader or slide assembly, having its lead wire selector slots under vacuum, slides by the loading end in each of the pressure stacked lead wire hoppers, to select and segregate a lead wire. As each selector slot is plugged the pressure in the detector drops causing the pressure responsive actuating means to close an electrical work circuit when all selector slots are filled. At the end of the slide's travel each lead wire is held in its selector slot in the slide adjacent the delivery slot in the stationary portion of the lead wire feeding apparatus.

In its general aspect the present invention has as its objective a method of, and apparatus for, loading lead wires into an automatic stem making machine.

A specific object of the invention is apparatus for feeding lead wires to the weld pocket of a stem making machine comprising a plurality of lead wire hoppers for supplying the required number of lead wires individually, a lead wire loader for selecting and segregating the desired number of lead wires, a vacuum type detector for detecting the presence of a full set of lead wires, and a transfer cup device for delivering a full set of lead wires to the weld pocket.

A further object is a transfer cup assembly for receiving in its "up" position a full set of lead wires from a lead wire loader and which is swingable over a weld pocket, and reciprocable downwardly above said weld pocket to deliver said leads thereto.

Other objects of the present invention will become apparent to those skilled in the art to which it appertains as the description thereof proceeds both by direct recitation and by implication from the context.

Referring to the drawings in which like numerals of reference indicate similar parts throughout the several views:

Fig. 1 is a diagrammatic plan view of an automatic stem making machine having the apparatus of the invention for feeding leads thereinto.

Fig. 2 is a side elevational view of a finished stem fabricated on the machine of Fig. 1.

Fig. 3 is a diagrammatic fragmentary side elevational view of the weld pocket, lead wires loaded therein, lead wire gathering fingers, and flare holder jaws prior to the raising of the weld pocket to introduce the lead wires into the flare at Station "9."

Fig. 4 is a plan view of the apparatus for loading a complete set of lead wires into a weld pocket of a head of the machine of Fig. 1, at Station "4."

Fig. 5 is a vertical sectional view of the lead wire loading apparatus of Fig. 4 along the line V—V of Fig. 4 in the direction of the arrows and showing the movement of the transfer cup assembly from the loading position to the position for lead wire discharge into the weld pocket.

Fig. 6 is a horizontal sectional view of the transfer cup assembly or device of the lead wire loading apparatus along the line VI—VI of Fig. 5 in the direction of the arrows.

Fig. 7 is a vertical sectional view of the transfer cup assembly of the lead wire loading apparatus in the lead wire "discharge" position over the weld pocket along the line VII—VII of Fig. 6 in the direction of the arrows.

Fig. 8 is an enlarged vertical sectional view of the lower portion of the transfer cup in the lead wire "discharge" position along the line VIII—VIII of Fig. 6, and similar to Fig. 7.

Fig. 9 is a horizontal sectional view of the lead wire guide chute of the lead wire loader along the line IX—IX of Fig. 5 in the direction of the arrows.

Fig. 10 is a side elevational view of the frame, upper or head conveyor chain, lower or weld pocket conveyor chain and drive mechanism for the lead wire loader and transfer cup assembly.

Fig. 11 is an enlarged fragmentary plan view of a portion of Fig. 4 of the lead wire loader in the lead wire discharge position and vacuum type lead wire detector with portions thereof broken away to show the details thereof.

Fig. 12 is a vertical sectional view of the lead wire loader and lead wire detector of Fig. 11 along the line XII—XII in the direction of the arrows.

Fig. 13 is an exploded view of the lead wire retaining inserts and loading slots of the lead wire loader slide.

Fig. 14 is a wiring diagram of the lead wire detecting circuit and lead wire delivery circuit and an operating relay activation circuit with the parts in the position shown on the line A—A of the operational cycle of Fig. 15.

Fig. 15 is a diagrammatic view of the operational cycle of the apparatus for loading lead wires into a stem making machine.

Fig. 16 is a flow chart illustrating the method of stem manufacture of the invention.

Fig. 17 is a diagrammatic side elevational view of a modification of the pressure sensitive actuating means employed by the vacuum type lead wire detector of the invention.

Referring now to the drawings and, more particularly to Fig. 1, the reference numeral 10 designates an automatic stem making machine incorporating an improved lead wire loading apparatus 12 and vacuum type lead wire detector 14 (Fig. 14) of the invention.

The automatic stem making machine 10 may be employed to fabricate a stem 16 (Fig. 2). This stem 16 may comprise, as shown in Figs. 2 and 3, a flare 18 sealed by means of its press 19 to a plurality of, for example four, lead wires 20. The stem 16 may also be provided with an exhaust tubulation 22 and a vitreous arbor 23 projecting from the press 19 for insertion therein of filament support wires (not shown).

This automatic stem making machine 10 has a base 24 shown in Fig. 10. A tool rail 25 is carried by the base 24 and in turn supports lower spacers 26. A lower or weld pocket conveyor chain frame 27 for carrying a lower chain conveyor 27a provided with a plurality of reciprocable weld pockets 28 (Figs. 3, 5, and 7), for example thirty-seven thereon, is supported by the spacers 26. An upper or head conveyor chain frame 29 (Fig. 10) which carries an upper chain conveyor 29a provided with a plurality of stem fabricating heads 30 (Figs. 4 and 5) thereon (one head 30 for each weld pocket 28) rests on upper spacers 31 (Fig. 10). These spacers 31 in turn are carried by the lower chain frame 27. An out board upper bearing 32 (Fig. 10) of a conventional chain indexing mechanism (not shown) for indexing the thirty-seven heads 30 and the weld pockets 28 through a like number of work stations, projects above the upper chain frame 29 (Fig. 10).

Between Station "3" and Station "4" (Fig. 1) of the automatic stem making machine 10, a weld pocket detector or normally open microswitch 40 (Figs. 4 and 6), designated diagrammatically in Fig. 14, may be provided with a detecting microswitch arm or finger 42 which remains stationary (during indexing of a head 30 and after a normally closed resetting switch 200 (Fig. 4) has been opened), if the weld pocket is empty, thus maintaining the switch 40 in the open position.

At Station "4," with a weld pocket 28 being in its lowermost position (Figs. 1, 4 and 5), the apparatus 12 for loading lead wires 20 of the invention first detects by means of the vacuum type lead wire detector 14 (Fig. 14) the presence of a full set of lead wires 20 in a lead wire loader 45 (Figs. 4, 5 and 10) of the apparatus 12. Then the loader 45 feeds a full set of lead wires 20 into a transfer cup assembly or device 46 (Figs. 5, 6, 7 and 10) of the apparatus 12 for loading lead wires 20. This transfer device 46 delivers the full set of lead wires 20 into the clean weld pocket 28 at Station "4."

At Station "6" a flare holder jaw assembly 47 (Figs. 3 and 4) of a head 30 is opened and a flare 16 is delivered thereinto if lead wires 20 in a pocket 28 indexing into Station "6" moves an arm 50 of a lead wire detector or normally closed microswitch 49 with a stationary contact 48 of the switch 49, thus closing the switch 49. This switch 49 energizes a coil 338 (Fig. 14) of a solenoid (not shown) for preventing loading of a flare 18 into a flare holder jaw assembly 47 (Fig. 4). A first flare detector or normally closed microswitch 51 at Station "7," similar in construction to the weld pocket detector or microswitch 40 at Station "3," has a swingable microswitch arm 52 (Fig. 14) and a normally closed contact 54. As shown in Fig. 14, if a flare 18 is present, the swingable arm 52 is moved away from the contact 54. If the switch 51 closes at Station "7," a coil 346 (Fig. 14) of a lead wire removal solenoid (not shown) is energized and the lead wires 20 will be removed by conventional means, such as an air blast or a conventional lead wire abstractor, not shown. The lead wires 20 are gathered together at Station "9" by a lead wire gathering device 56 (Fig. 3), and the weld pocket 28 is raised, as hereinafter explained, to insert the lead wires 20 within the flare 18 held in the flare holding jaw assembly 47.

A second flare detector or normally closed microswitch 58 (Fig. 14) at Station "10" also has a microswitch arm 60 and a normally closed contact 62. If a flare 18 is missing the switch 58 remains closed and a coil 354 (Fig. 14) of a solenoid (not shown) for preventing loading of an exhaust tube 22 is energized and an exhaust tube 22 is not delivered to an exhaust tube holder assembly 64 of a head 30 (Figs. 4 and 5) at Station "10." If the second flare detector switch 58 is opened, an exhaust tube 22 is delivered to the assembly 64 at Station "10." An exhaust tube detector or normally closed microswitch 66 (Station "11") having a swingable microswitch arm 67 and a normally closed contact 68 may cause, if a tube 22 is missing and if the switch 66 remains closed, the energization of a coil 330 (Fig. 14) of a solenoid (not shown) for removing the lead wires 20 and the flare 18 at Station "11," if an exhaust tube 22 was not loaded at Station "10."

Inasmuch as the method of manufacture and the apparatus employed at the remaining work stations of the stem making machine 10 are conventional, it is not deemed necessary for the purposes of explaining the invention, herein to be discussed, that the remaining portions of the stem making cycle be explained in detail. In the following general description of the conventional operation of the stem making machine the tooling at the various stations is identified in Fig. 1 by caption and not by reference numeral.

Stem heating fires at Stations "13" through Station "32" (Fig. 1), a first stem press at Station "20" and a second stem press at Station "27" may be employed. At Station "33" a no-blowout and exhaust tube detector and weld pocket pushdown device may be used. A defective stem remover may dispose of any stem at Station "34." A lead wire spreader at Station "36" positions the lead wires 20 for the filament mounting operation. The finished stem 16 may be transferred from the stem making machine at Station "37."

Heads 30

As shown in Figs. 4, 5 and 10 the upper conveyor chain 29a (Fig. 10) comprises a series of links 70. Each link 70 carries an inner roller 72 (Fig. 10) in engagement with a conveyor track 74 on the frame 29 and an outer roller 76 engaging the outer surface of the track 74. A shaft 75 (Fig. 10) extends through a goose-neck flange (not shown) of the link 70 and the plate-like body (not shown) of the next link 70 and carries the outer roller 76 thereon. A head 30 is mounted on the link 70 by means of pins (not shown) projecting from the underside of the link 70 and into the body or casting 80 of a head 30.

The casting 80 (Fig. 5) has a shaft supporting hub portion 84a, for journalling therein, an operating shaft 84 (Fig. 4). This shaft 84 carries a flare holder locking arm 85 on its lower end for engagement with the flare holder jaw assembly 47, adjustably mounted (Fig. 5) on the lower side wall of the casting 80.

An exhaust tube holder jaw locking arm 85' pivotable on the shaft 84 secures an exhaust tube 22 in the exhaust tube holder assembly 64 (Fig. 5) adjustably fixed to the side wall of the casting 80 above the flare holder jaw assembly 47. The casting 80 carries an exhaust tube guide (not shown) below the exhaust tube holder assembly 64.

A cam engaging operating arm 94 on the upper end of the shaft 84 carries a return spring pin 94a (Fig. 5) depending therefrom and is engageable with a stationary cam 96 (Figs. 4 and 5) mounted on the upper chain frame 29, adjacent Station "4," the lead wire loading station, to open the flare holder locking arm 85 of the flare holder jaw assembly 47 and permit loading of a weld pocket 28 with lead wires 20.

A pin 98 (Fig. 5) projects above and depends below the link 70. A return spring 98a (Fig. 5) extends between the pin 98 and the pin carried by the operating arm 94. A similar spring (not shown) extends from the pin 98 through a clearance hole (not shown) in the casting 80, to the movable exhaust tube holder locking arm 85' of the exhaust tube holder assembly 64.

Weld pocket 28

Each of the weld pockets 28 (Figs. 4, 5, 6, and 10) has a mounting bracket 106 (Fig. 5) secured to a link 70 of the lower conveyor chain (Fig. 5). A vertical roller guide plate 108 on the bracket 106 supports a weld pocket carriage 110. This carriage 110 rides on the guide plate 108 by means of rollers 112 (Figs. 4 and 5) and is provided with a shaft 114 for connection to a weld pocket reciprocating mechanism (not shown).

A lead wire receiving body 116 of the weld pocket 28 is carried by the carriage 110. This body 116 (Fig. 3) comprises a cylinder provided with lead wire receiving slots 116a (Fig. 3) spaced about the periphery and an axial arbor receiving center hole.

Apparatus for loading lead wires

As shown particularly in Fig. 10, a lead wire loader mounting bracket or casting 130 (Figs. 4, 5, and 10) is suitably affixed to the tool rail 25. This bracket 130 has a generally inverted L-shaped vertical cross-section, as shown in Fig. 10, and has an upper plate-like mounting flange 131a (Fig. 7), a lower shaft bearing flange 131b, and an operating and retaining flange 131c. The bracket 130 supports a pair of mount rods 132 upstanding from the upper plate-like mounting flange 131a. These mount rods 132 carry a lead wire loader mounting platform 134 (Figs. 4, 5, 10 and 12) which is secured to the upper portions of the rods 132. As shown particularly in Fig. 12 a bottom plate 136 of a plurality of lead wire hoppers 138, for example four in the present showing of Fig. 4, rests on the mounting platform 134.

Hoppers

These hoppers 138 (Figs. 4 and 11) are essentially an open box partitioned in the middle and provided with tapered guide blocks 139 at their exit ends.

In addition to the bottom plate 136, the hoppers 138 have longitudinal side-walls 140 (Figs. 5 and 12) separated by a center partition 142 (Fig. 4) and integrated at the ends by end wall portions or plates 144. A lead wire feeding pad 146 (four in number, one for each hopper 138) is carried on the end of a plunger 148 (Fig. 4), which is biased by a spring 148a and extends through an end portion 144 and into each hopper 138. Each pad 146 compresses the lead wires 20 into a vertical stack and forces them toward the tapered lead wire feeding or discharge end of each hopper 138, formed between the block 139 and the center partition 142 (Fig. 11).

Longitudinal guide rods or rails 150 (Figs. 4, 5, 10 and 12), extending between the extreme outside portions of the end plates 144, carry spring biased lead wire locking pin mounting blocks 152 which are slidable thereon. Lead wire locking pins 154 project from the blocks 152 (Fig. 4) horizontally across the hoppers 138. It will be understood there is one pin 154 for each hopper 138. These retractable locking pins 154 may be employed to maintain the lead wires 20 in the desired compressed lead wire feeding position, shown in Fig. 4, while the pads 146, for example, are retracted, either by hand or by mechanical means (not shown) to permit the loading of additional lead wires 20 in the space between the retracted pad 146 and the locking pin 154 in each of the lead wire hoppers 138.

As shown particularly in Fig. 11 the tapered delivery ends of the hoppers 138 are adjacent to a lead wire selector slide 160 (Figs. 4, 5, 10, 11 and 12) of a selecting means and a securing means, such as the lead wire selector slide assembly or lead wire loader 45.

Lead wire selector slide assembly 45

The selecting means comprises essentially the slide 160 which reciprocates horizontally (Fig. 4) in a pair of bearings 161 (Fig. 5) mounted in the side walls 140 of the hoppers 138. This slide 160 carries, on either side thereof, a center insert 164 (Figs. 11, 13 and 14) and flanking adjacent end inserts 166, shown in exploded view in Fig. 13. Each of the longitudinal edges of the end inserts 166 is provided with half of a lead wire selecting slot which is complementary to similar half slots provided in the edges of the center insert 164. Thus, when the inserts 166 and 164 are assembled in the slide 160 as shown in Fig. 11, these half slots form the lead wire selecting slots 168, shown therein.

To provide a securing means it will be understood from a consideration of Figs. 5, 11, 12, 13, and 14 that the lead wire selector slots 168 are connected by a generally U-shaped exhaust groove 170 in the center insert 164 to a transverse exhaust chamber or large hole 171 (Fig. 14) which is within the slide 160 and connects both grooves 170. As shown particularly in Fig. 12 a vertical pressure detecting hole 172 is provided in the slide 160 and extends of the chamber 171. This hole 172 is plugged at its upper end by a plug 172a (Fig. 12). A pressure detecting line 173 (Figs. 5 and 12) may extend from hole 172 through the right hand end portion (when viewed in Fig. 5) of the slide 160 for use as hereinafter described. An exhaust line 173a suitably parallel to the line 173 extends from the chamber 171 to a three-way valve 222 (Fig. 14).

A vertical discharge groove 174, desirably semi-circular in cross section, is provided (Fig. 11) in the slide engaging faces of the center partition 142 and a vertical discharge groove 174a is provided in the right hand (when viewed in Fig. 11) guide blocks 139. As the delivery slots 168 in the slide 160 come to rest adjacent these grooves 174 and 174a, the leads 20 held in the delivery slots 168 are released into the delivery grooves 174 and 174a, when the vacuum within the slide 160 is destroyed, as hereinafter explained.

It will be understood that the selector slots 168 in the reciprocable slide 160 (Figs. 4, 5, and 11) move to the left (when viewed in Fig. 11) from the delivery position shown in Fig. 11 opposite the delivery groove 174, to a position just inside the delivery end of the lead wire hoppers 138; remain in this position (Fig. 15) for a predetermined time to permit lead wires 20 to locate themselves in the slots 168; move forwardly to the left hand end of the delivery end of the hoppers 138 (when viewed in Fig. 11) for a final try at loading a lead wire 20, and then move to the right (when viewed in Fig. 11) across the delivery end of the lead wire hoppers 138 to a position opposite the delivery grooves 174 in the center partitions 142 and the guide blocks 139. This back and forth motion of the slide 160 substantially insures the selection of a lead wire 20 from the wires 20 in a hopper 138, by each selector slot 168.

In addition to the slide 160, the lead wir selector slide assembly 45 comprises a lead wire delivery chute 180 provided with a plurality of delivery holes 181, four in number (Figs. 5, 9, 10 and 12), and a lead wire selector slide operating mechanism 182 shown particularly in Figs. 4, 5, 6 and 10.

*Lead wire selector slide assembly operating mechanism*

A pair of links 184 (Figs. 4, 5 and 10) of the lead wire selector slide assembly operating mechanism 182 connect the left hand end (when viewed in Fig. 5) of the slide 160 to an upper arm of an upper bell crank lever 186. The lever 186 (Fig. 5) is fixed to a lever shaft 187 mounted on brackets depending from the mounting platform 134 of the lead wire loader 45. The lower arm of the bell crank lever 186 is connected by means of a universal joint to a connecting rod 188. The lower end of the connecting rod 188 (Figs. 4, 5, 6 and 10) may be joined by a second universal joint to a lower bell crank lever 190 (Fig. 4) on a stud shaft 192 supported by brackets (not shown) upstanding from the base 24 of the machine 10. A roller 191 on an arm of the bell crank lever 190 (Fig. 10) is held in engagement with a slide operating cam 194 on a longitudinal main cam shaft 196 of the machine 10 (Figs. 1, 6 and 10) by means of a spring 193.

A microswitch mounting bracket 198 (Fig. 10) upstanding from the base 24 of the machine 10 carries a cycle resetting microswitch 200 (Figs. 10 and 14) and a lead wire discharge microswitch 202. The switches 200 and 202 may be actuated by microswitch operating cams 204 and 205 respectively on a second longitudinal cam shaft 206 (Figs. 1 and 10) of the machine 10. It will be understood that the cam shafts 196 and 206 are journalled in suitable bearings (not shown) upstanding from the base 24 of the machine 10.

The cycle resetting switch 200 as shown in Figs. 14 and 15, is normally closed and is opened during indexing, to reset the vacuum type lead wire detector 14 of the invention. The lead wire discharge microswitch 202 is normally open and is actuated briefly to discharge the lead wires 20 from the lead wire selector slide assembly 45, as hereinafter explained. Closure of the switch 202 releases the lead wires 20 from the selector slots 168, into the discharge grooves 174, through guide holes in the bottom plate 136 of hoppers 138 (Fig. 12) and the delivery chute 180 and into the transfer cup assembly 46.

*Vacuum type lead wire detector 14*

The vacuum type lead wire detector 14 (Figs. 4, 5, 10, 11, 12 and 14) of the invention employs the selector slots 168 in the slide 160 of the lead wire selector slide assembly 45 as lead wire detecting fingers. The above mentioned exhaust groove 170, the exhaust chamber 171, the vertical probe hole 172 and the pressure detecting line 173 form a vacuum detecting line or system through the slide 160. As shown diagrammatically in Fig. 14, the vacuum line 173 extends to a pressure responsive actuating means 212, such as the bellows shown in Fig. 12 or the vacuum gauge 212', shown in Fig. 17.

As shown particularly in Figs. 4, 12 and 14, the preferred embodiment of the pressure responsive actuating means 212 (the bellows of Fig. 12) may be suitably mounted (Fig. 4) on a bracket 213 upstanding from the mounting platform 134 of the lead wire loader 45, and carries an operating arm 214 (Fig. 12) for engagement with a movable arm of, for example, a normally open microswitch 218.

The exhaust chamber 171 (Figs. 5, 12 and 14) in the slide 160, is connected by means of the vacuum line 173a to a three-way solenoid operated valve 222 (Fig. 14). This valve 222 is provided with an air inlet line 224 and a line 226 (Fig. 14) leading to a suitable evacuating means (not shown), such as a conventional vacuum pump of the type shown in U.S. Patent No. 1,623,315, issued April 5, 1927 to J. R. Kinney.

It will be understood that when there are no lead wires 20 in the selector slots 168 of the slide 160 that air will rush into the slots 168; through the exhaust groove 170 and the exhaust chamber 171 within the slide 160; through the exhaust line 173 to the pressure responsive actuating means 212. This air will expand the bellows 212 (Figs. 12 and 14) moving the operating arm 214 to the left (when viewed in Fig. 12) and leave the switch 218 in its normally open position. It is obvious that as each of the selector slots 168 in the slide 160 selects a lead wire 20 from a hopper 138, the opening through the selector slot 168 is plugged by the lead wire 20. The pressure within the vacuum type lead wire detector 14 decreases proportionately. Thus, when all the selector slots 168 in the slide 160 are filled, the pressure within the detector 14 drops and the pressure responsive actuating means (the bellows) 212 contracts to close the switch 218, thus loading lead wires 20 into the transfer cup assembly 46 from the lead wire loader 45, as hereinafter explained.

*Operation of lead wire slide assembly*

It will be understood from a consideration of Fig. 15 that after about $$\frac{30}{360} \text{ or } \frac{1}{12}$$

of a cycle (and during $$\frac{60}{360} \text{ or } \frac{1}{6}$$

cycle) the slide 160 is moved to the left (when viewed in Fig. 11) by the slide reciprocating mechanism 182 from the discharge position shown therein until the selector slots 168 reach the right hand end of the lead wire discharge openings in the hoppers 138. The slide 160 as shown in Fig. 15 does not move for about $$\frac{60}{360} \text{ or } \frac{1}{6}$$

of cycle, giving the lead wire detector 14 its opportunity to work. Finally the slide 160 is moved further to the left (when viewed in Fig. 11) by the mechanism 182 during the next $$\frac{60}{360} \text{ or } \frac{1}{6}$$

cycle to the left hand end of the discharge opening in hoppers 138 and then back to the right to the position, shown in Figs. 5 or 11, thus giving the selector slots 168 a second chance to pick up a lead wire 20, if for some reason, they fail in the first attempt.

Alternative embodiment of the pressure responsive measuring means

As shown in Fig. 17 the vacuum line 173 may be alternately connected to vacuum type gauge 212'. This monometer type vacuum gauge may employ, for example, mercury as the liquid contained therein. A line 230 may connect a contact 232 projecting from the bottom portion of the gauge 212' to one side of the voltage supply or a junction point 233 in Fig. 14. A second line 234 may connect a second contact 236 to the other side of the voltage supply through a signal system or, as shown in Fig. 14, to a junction point 237.

It will be understood if a lead wire 20 is missing from each of the four selector slots 168 in the slide 160, air rushing thereinto (as previously explained) will cause a high reading, as indicated at postion 1 of the gauge 212' in Fig. 17. If one lead wire 20 is picked up in a selector slot 168, the pressure reading will be proportionately lower, as indicated by position 2 on the gauge 212'. Thus, as each selector slot 168 picks up a lead wire 20 the opening therethrough is plugged and the pressure reading within the gauge falls until the mercury extends between the contacts 232 and 236, thus closing the signal or work circuit mentioned above.

Transfer cup assembly 46

A rotating or oscillating shaft 240, Figs. 3, 4, 5, 6, 7, 8 and 10, of the lead wire transfer assembly 46 extends through the upper plate-like flange 131a, the lower shaft bearing flange 131b and the operating and retaining flange 131c of the lead wire loader mounting bracket 130, as shown particularly in Fig. 10. The shaft 240 is journalled therein on suitable bearings in said flanges. A transfer cup mounting and support arm 244 (Figs. 5, 6, 7 and 10) is secured by means of its hub portion to the upper portions of the rotating shaft 240. This transfer cup support arm 244 carries a transfer cup 246 handily provided with lead wire receiving holes 248 (Figs. 5 and 7) and a lead wire transfer cup release assembly 250 (Figs. 5, 6, 7 and 8) carried on the bottom face of the arm 244 as shown in Fig. 6 transverse to the longitudinal axis of the arm 244.

Transfer cup release assembly 250

This transfer cup release assembly 250 (Figs. 5, 6, and 7) comprises a slide guide 251, secured to the transfer cup support arm 244 and transverse thereto (Figs. 5 and 8). The guide 251 carries a spring biased slide engaging detent 252 (Fig. 5) depending therefrom which engages a notch (not shown) in a slide 253, retained in the slide guide 251 by means of a retaining plate 254. The slide 253 extends over the bottom portion of the transfer cup 246 and is provided with lead wire receiving holes 255 (Fig. 8) which are registerable with the lead wire receiving holes 248 of the transfer cup 246.

When the detent 252 is engaged in the notch in the slide 253, the holes 255 in the slide are not in register with the holes 248 in the transfer cup 246. The slide 253 carries a release plate 256 (Figs. 5, 7 and 8) for engagement with a lead wire release stop 257 and a transfer cup slide resetting stop 258 (Fig. 6), as hereinafter explained. The stationary delivery stop 257 is located on a shaft 259 (Fig. 5) secured in the flange 131a of the lead wire loader mounting bracket 130. The stop plate 258 is carried by a bracket 260 mounted on the left hand mount rod 132, when viewed in Figs. 5, 6 and 10.

As the transfer arm 244 in its "down" position swings in a clockwise direction from the solid position of Fig. 6 to the dotted position of Fig. 6, the lead wire release stop plate 257 restrains the release plate 256 and hence the slide 253. The transfer cup 246 continues to swing until the holes 248 in the transfer cup register with the holes 255 in the slide 253 (in the delivery position) and the lead wires 20 fall from the transfer cup 246 into the weld pocket 28 therebelow.

As the transfer arm 244 in its "up" position is rotated or swung counterclockwise (Fig. 6) on the return swing, the slide resetting stop plate 258 restrains the slide 253 near the end of the swing. The transfer cup 246 continues to swing beyond, so that the holes 248 in the transfer cup 246 move out of register with the holes 255 in the slide 253.

Transfer cup assembly rotating mechanism

A transfer cup assembly rotating mechanism 261 (Figs. 6 and 10) has an operating lever or yoke 262 keyed to the rotating shaft 240 between the flanges 131b and 131c (Fig. 10) of the lead loader. An adjustable link 264 connects the outer end of the yoke 262 with a bell crank lever 266 on the lever shaft 192 (Figs. 6 and 10) of the machine 10. This bell crank lever 266 carries a roller (Figs. 6 and 10) on its lower arm which is held in continuous engagement with a transfer cup assembly swinging cam 268 (on shaft 196) (Figs. 6 and 10) by means of a spring 270 extending from the upper arm of the lever 266 to the microswitch mounting bracket 198.

Transfer cup assembly reciprocating mechanism 282

A vertical shaft 280 of a transfer cup assembly reciprocating mechanism 282 (Figs. 6 and 10) is suitably journalled in the upper flange 131a of the mounting bracket 130 and in the lower flange 131b of the lead wire loader mounting bracket 130. This shaft 280 (Figs. 5, 6, and 10) carries a yoke 290 which fits around the rotating shaft 240. Collars 292 (Fig. 10) on the rotating shaft 240 prevent relative vertical movement between the shafts 240 and 280. A spring 294 extends from the upper portions of the reciprocating shaft 280 to the lower flange 131b and maintains a desired tension in a vertical direction on the reciprocating shaft 280. An adjustable connecting rod 296 (Fig. 10) joins the bottom portion of the reciprocating shaft 280 to a bell crank lever 298 (Figs. 6 and 10) on the lever shaft 192. A roller carried on the bell crank lever 298 engages a transfer cup assembly reciprocating cam 300 on the main cam shaft 196 of the machine 10.

Operation of transfer cup assembly

After $$\frac{30}{360} \text{ or } \frac{1}{12}$$

of a cycle and during the indexing period (Fig. 15), the transfer arm 244 and cup 246 are moved downwardly (from the position shown in Fig. 5) by the transfer cup assembly reciprocating mechanism 282. This motion is completed when lead wire loading slide 160 completes its first lead wire loading pass or within the next $$\frac{60}{360} \text{ or } \frac{1}{6}$$

of the cycle. The transfer cup 246 remains down for the next $$\frac{120}{360} \text{ or } \frac{1}{3}$$

of a cycle.
From $$\frac{90}{360} \text{ or } \frac{1}{4}$$

of a cycle to $$\frac{160}{360} \text{ or } \frac{4}{9}$$

of a cycle the transfer arm 244 and cup 246 are swung clockwise from the solid position to the dotted position shown in Fig. 6, by the transfer cup assembly rotating mechanism 261 and the lead wires 20 discharged into a weld pocket 28, as hereinbefore explained, by operation of the transfer cup release assembly 250. The cup 246 remains over the weld pocket 28 for the next $$\frac{100}{360} \text{ or } \frac{5}{18}$$

of a cycle.

During the time between $$\frac{210}{260} \text{ or } \frac{7}{12}$$

of a cycle and $$\frac{270}{360} \text{ or } \frac{3}{4}$$

of a cycle the transfer arm 244 and cup 246 are moved upwardly by the reciprocating mechanism 282. Just before the end of the upward travel of the cup 246

$$\left(\frac{260}{360} \text{ or } \frac{13}{18}\right.$$

of a cycle) both arm 244 and cup 246 are rotated counter clockwise (Fig. 6) by the rotating mechanism 261. Rotation of the cup 246 and the resetting of the release slide 253 are accomplished at $$\frac{330}{360} \text{ or } \frac{11}{12}$$

of the cycle and a new charge or set of lead wires 20 is fed into the transfer cup 246.

*Operating circuits (exhaust tube detecting circuit at Station "11")*

As shown in Fig. 14 a conductor 310 extends from one side of a suitable power supply through junction points 312, 314, 315, 316, and 317 to the swingable microswitch operating or detecting arm 67 of the exhaust tube detector or microswitch 66. The other side of the voltage supply is connected by a conductor 318 through a series of junction points 320, 321, 322, 324, 326, and 328 to one side of a coil 330 of the lead wire and flare removal solenoid (not shown). The other side of the coil 330 is connected by means of a conductor 332 to the normally closed contact 68 of the microswitch 66.

Thus, it will be seen from a consideration of Fig. 14 that when an exhaust tube 22 is missing from an exhaust tube holder assembly 64 of a head 30 of the machine 10, that the swingable microswitch arm 67 of the exhaust tube detector 66 remains in engagement with the contact 68 and a closed circuit exists from the power supply through the coil 330 of the lead wire and flare removal solenoid (not shown) at Station "11."

*Lead wire detecting circuit at Station "6"*

A conductor 334 extends from the junction point 315 with the conductor 310 to the microswitch arm 50 of the lead wire detector or microswitch 49 at Station "6." A conductor 336 extends from the junction point 326 with the line 318 through a coil 338 of a solenoid (not shown) for preventing the loading of a flare 22 at Station "6" to the normally closed contact 48 of the microswitch 49.

Thus, when the lead wires 20 are missing from a weld pocket 28 indexing into Station "6" the microswitch arm 50 does not move and the microswitch 49 remains closed. A closed circuit exists from the power supply through the coil 338 of the solenoid (not shown) for controlling the loading of a flare 22.

*First flare detecting circuit at Station "7"*

As shown in Fig. 14, a suitable conductor 316a extends from the junction point 316 with the conductor 310 to the swingable microswitch operating or detecting arm 52 of a first flare detector or microswitch 51 at Station "7." A conductor 344 extends from the junction point 326 with the line 318 through a coil 346 of a second lead wire removal solenoid (not shown) to the normally closed contact 54 of the microswitch 51.

Thus, when a head 30 indexes into Station "7" without a flare 18 therein the swingable arm 52 remains in engagement with the contact 54 and a closed circuit exists from the power supply through the coil 346 of the second lead wire removal solenoid (not shown) at Station "7."

*Second flare detecting circuit at Station "9"*

A conductor 317a extends from the junction point 317 with the conductor 310 to the movable microswitch operating or detecting arm 60 of the second flare detector or microswitch 58 at Station "9." A line 352 connects the junction point 328 with the line 318 through a coil 354 of a solenoid (not shown) for preventing the loading of the exhaust tube 22 at Station "9," if a flare 18 is missing thereat to the normally closed contact 62 of the microswitch 58.

Thus, when a head 30 indexes into Station "9" without a flare 18 therein the microswitch arm 60 maintains its contact with the contact 62 of the microswitch 58 and a closed circuit exists from the power supply through the coil 354 of the solenoid (not shown) for controlling the feeding of an exhaust tube 22.

*Lead wire loading circuit*

The lead wire loading circuit comprises essentially a weld pocket detecting circuit in parallel with an operating relay activation circuit and a lead wire delivery circuit.

It will be understood that the parts of the lead wire loading circuit are shown in Fig. 14 just before the closing of the cam operated lead wire delivery microswitch 202.

*Weld pocket detecting circuit*

A conductor 312a connects the junction point 312 with the line 310 to one side of the normally closed resetting microswitch 200. The other side of the resetting switch 200 is connected by a line to a junction point 364 with a line 366 leading to the contact 44 of the normally open weld pocket detector or microswitch 40 between Station "3" and Station "4." The other side of the detector or microswitch 40 is connected by a line 368 through a junction point 370 through a coil (not shown) of a relay 374 to the junction point 320 with the line 318.

Thus, when there are lead wires 20 in a weld pocket 28 indexing between Stations "3" and "4" the detector or microswitch 40 is momentarily closed and a closed circuit exists through the cam operated resetting switch 200, the now closed weld pocket detector 40 and the coil (not shown) of the relay 374. A normally open holding contact 380 and a normally closed contact 381 of the relay 374 are closed and opened respectively.

A conductor 370a joins the junction point 370 with the line 368 to one side of the normally open holding contact 380 of the relay 374. The other side of the contact 380 is joined by a conductor 382 to a junction point 384 with the line 366.

Thus, when the coil (not shown) of the relay 374 is energized by the aforementioned circuit, the normally open holding contact 380 becomes closed. A closed holding circuit now exists through the cam operated switch 200, the now closed holding contact 380 and the coil of the relay 374.

*Operating relay activation circuit*

The conductor 366, it will be understood, extends from the junction point 364 through the junction point 384 with the line 382 to the hereinbefore mentioned junction point 237 with the line 234. The line 234 extends through the normally closed bellows operated switch 218, to the junction point 233, a coil (not shown) of a second relay 392 having normally open (but now shown closed in Fig.

14) contacts 394 and 396 to the junction point 322 with the conductor 318.

Thus, when there is a lead wire 20 in each of the selector slots 168 of the lead wire loader 45, the pressure responsive actuating means or bellows 212 is in a contracted position, shown in Fig. 14 and the switch 218 remains closed. A closed circuit now exists through the cam operating resetting switch 200, the bellows operated switch 218 and the coil (not shown) of the relay 392. The normally open contacts 394 and 396 of the relay 392 are now closed.

A conductor 397 extends from the junction point 233 with the line 234 through the normally open, but now closed, holding contact 394 of the relay 392 to the junction point 237 with the lines 366 and 234.

*Lead wire delivery circuit*

A line 314a connects the junction point 314 with the conductor 310 to one side of the normally open lead wire delivery cam switch 202. The other side of the switch 202 is connected by a line 402 extending through a junction point 404, a signal lamp 405 and a junction point 406 through a coil 408 of the lead wire discharge solenoid (not shown) for operating the 3-way valve 222 (shown in Fig. 14) to the junction point 321 with the line 318.

A conductor 420 extends from the junction point 404 with the conductor 402 through the normally closed (if the weld pocket 28 is "clean" between Stations "3" and "4") contact 381 of the relay 374, through the normally open but now closed (due to the energization of the relay 392) contact 396 of the relay 392, to a junction point 406 with the line 402.

Thus, if no lead wires 20 are detected in a weld pocket 28 between Stations "3" and "4" during the indexing of a head 30 therebetween, by the weld pocket detector 40, the relay 374 is not energized and the normally closed contact 381 thereof remains closed. At Station "4," as the lead wire selector slide 160 fills the selector slots 168 therein with lead wires 20 from the hoppers 138, the pressure within the pressure responsive actuating device (i.e. the bellows 212) drops, and the bellows 212 contracts. Contraction of the bellows 212 closes the switch 218, energizing the second relay 392 and closing the normally open contacts 394 and 396, thus readying the lead wire delivery circuit for activation upon closure of the cam operated lead wire delivery switch 202.

As shown in Fig. 15, when the lead wire delivery microswitch 202 is activated by the cam 205 on the cam shaft 206, the coil 408 of the valve solenoid (not shown) is energized. The 3-way solenoid operated valve 222 is turned in a clockwise direction 90° (Fig. 14) by means of an operating plunger 500 (Fig. 4) and a connecting link 502, so that the vacuum line 173 (and the exhaust chamber 171 within the slide 160) are disconnected from the evacuation system (not shown) and connected to the atmosphere line 224. Air rushing into the exhaust chamber 171 through exhaust groove 170 to the selector slot 168 releases the formerly vacuum held lead wires 20. The lead wires 20 drop downwardly through the guide holes 136a in the bottom plate 136 (Fig. 5), the guide holes 181 in the lead wire chute 180 and into the lead wire receiving holes 248 in the transfer cup 246 of the transfer cup assembly 46, as hereinbefore mentioned.

*Test circuit*

As shown in Fig. 14 a test circuit may be provided in parallel with the coil of the relay 392, to check a continuous circuit through the resetting switch 200 and the bellows operated switch 218. A conductor 504 may connect the junction point 233 with the lines 234 and 397 through a normally open manually operated switch 506, and through a signal lamp 510 to the junction point 324 with the line 318.

Thus, if the coil of the relay 392 fails to operate and the manual switch 506 is closed, a closed circuit should exist through the resetting switch 200, the bellows operated switch 218, switch 506 and the signal lamp 510. The lamp 510 should light.

*Summary*

Thus, it will be seen from the foregoing description that the method of the invention for loading a full set of lead wires 20 at one time at one station, for example Station "4" of the automatic stem making machine 10, comprises detecting a clean weld pocket 28 during indexing of a head 30 between Stations "3" and "4" by means of a normally open weld pocket detector 40; detecting the presence of a complete set of lead wires 20 in the lead wire loader 45 during the selection or segregation thereof by a vacuum type lead wire detector 14, thus insuring non-delivery of the lead wires 20, if less than a complete set of lead wires 20 is present in said lead wire loader 45 and a possible second attempt by the slide 160 of the lead wire loader 45 to deliver a complete set of lead wires 20 on the next portion of the work cycle; loading a complete set of lead wires 20 into a weld pocket 28 at one time at Station "4"; detecting the lead wire 20 with a lead wire detector 49 at Station "6" and loading a flare 18 into a flare holder assembly 47 of a head 30 at said Station "6"; detecting a flare 18 at Station "7" and removing the lead wires 30 from the weld pocket 28 if a flare 18 is not present in a flare holder assembly 47 of a head 30; gathering the lead wires 20 by means of a lead wire gathering device 56 (Fig. 3) and raising the weld pocket 28 to position the lead wires 20 within the flare 18 at Station "8"; detecting a flare 18 by means of a second flare detector 58 at Station "9" and loading an exhaust tube 22 into an exhaust tube holder assembly 64 thereat if a flare 18 is present; detecting an exhaust tube 22 at Station "11" by means of an exhaust tube detector 66 and removing said lead wires 20 and said flare 18 if said exhaust tube 22 is missing therefrom.

The apparatus 12 feeds lead wires 20 to a weld pocket 28 of a stem making machine 10. The apparatus 12 comprises a plurality of lead wire hoppers 138 for supplying the required number of lead wires 20 individually, a lead wire loader or slide assembly 45 for selecting and segregating the desired number of lead wires 20 in selector slots 168 provided in the slide 160, a vacuum type lead wire detector 14 for detecting the presence of a full set of lead wires 20 in the slide 160 and a transfer cup assembly 46 for delivering a full set of lead wires 20 to the weld pocket 28.

The lead wire loader 45 (having its lead wire selector slots 168 under vacuum) slides into contact with (on the first attempt) and across (on the second attempt) the loading end of each of the pressure stacked lead wire hoppers 138 to select and segregate a lead wire 20 within each slot 168. As each selector slot 168 is plugged with a lead wire 20 the pressure in the vacuum type detector 14 drops, thus causing the pressure responsive actuating means (i.e. the bellows 212 of Fig. 12 or the vacuum gauge 212' of Fig. 17) to close the switch 218 in the lead wire delivery circuit mentioned above. At the end of the motion of the slide 160, each lead wire 20 is held in its selector slot 168 adjacent the delivery grooves 170 in the center partition 142 and guides 139 in the hoppers 138.

The vacuum type lead wire detector 14 of the invention comprises the slide 160 of the selector slide assembly 45, a solenoid operated valve 222 between the slide 160 and the evacuating means (not shown) and a pressure responsive actuating means, such as the vacuum gauge 212' of Fig. 17 or the pressure responsive bellows 212 of Fig. 12 for operating a switch 218 in an electrical work circuit for delivering lead wires 20 from the selector slots 168 in the slide 160 through bottom plate 136 of the hoppers 138 and the chute 180 into the lead wire receiving holes 248 of the transfer cup assembly 46 therebelow.

The lead wire loading circuit of the invention has a normally closed cam operated resetting switch 200 in series with a normally open weld pocket detector 40 and a coil (not shown) of a relay 374 having a normally open holding contact 380. A normally closed operating contact 381 of the relay 374 is in series with the normally open contact 396 of a second relay 392 (having a normally open holding contact 394), a normally open but momentarily closed cam operated lead wire delivery switch 202 and the coil 408 of tht valve activating solenoid (not shown). The coil of this second relay 392 is in series with the bellows operated switch 218, and both are paralleled with the weld pocket detector 40 and coil of the first relay 374.

Although a preferred embodiment of the invention has been disclosed it will be understood that modifications may be made within the spirit and scope of the invention.

I claim:

1. Apparatus comprising an article storing means for containing a plurality of articles, a hollow article selecting means provided with a slot for receiving an article therein, drive means operatively connected to said article selecting means for moving the latter along said article storing means, said slot being adapted to receive an article from said article storing means during movement therealong, a pressure responsive means connected to said article selecting means and said slot and operable to indicate the presence of said article in said slot, valve means operatively connected to said article selecting means and said slot, evacuating means operatively connected to said valve means and normally communicable with said slot to secure by suction said article received therein during movement of the article selecting means along said article storing means, atmosphere inlet means connected to said valve means and operable to destroy the vacuum within said article selecting means and in said slot, actuating means operatively connected to said pressure responsive means and rendered operative by the pressure responsive means when an article is present in said slot as determined by the pressure responsive means, and operating means operatively connected to said valve means and said actuating means, said operating means being operable to cause operation of said valve means to admit air from said atmosphere inlet means to said article selecting means and said slot, thereby causing the release of said article therefrom.

2. Apparatus comprising an article receiving means, an article storing means for containing a plurality of articles, a hollow article selecting means provided with a slot for receiving an article therein, drive means operatively connected to said article selecting means for moving the latter along said article storing means, said slot being adapted to receive an article from said article storing means during movement therealong, a pressure responsive means connected to said article selecting means and said slot and operable to indicate the presence of said article in said slot, valve means operatively connected to said article selecting means and said slot, evacuating means operatively connected to said valve means and normally communicable with said slot to secure by suction said article received therein during movement of the article selecting means along said article storing means, atmosphere inlet means connected to said valve means and operable to destroy the vacuum within said article selecting means and in said slot, actuating means operatively connected to said pressure responsive means and rendered operative by the pressure responsive means when an article is present in said slot as determined by the pressure responsive means, operating means operatively connected to said valve means and said actuating means, said operating means being operable to cause operation of said valve means to admit air from said atmosphere inlet means to said article selecting means and said slot, thereby causing the release of said article therefrom, and detecting means disposed adjacent said article receiving means and operatively connected to said operating means for detecting the presence of an article in said article receiving means prior to the release of said article from said slot, said operating means being rendered inoperative by said detecting means when there is an article present in said article receiving means prior to the release of said secured article from said slot, thereby preventing the release of said secured article to said article receiving means.

3. Apparatus comprising a plurality of article storing means, a hollow article selecting means, drive means operatively connected to said article selecting means for moving the latter between said article storing means, said article selecting means being provided with a plurality of slots, each slot being adapted to receive an article from said article storing means during movement of the article selecting means therebetween, a pressure responsive means connected to said article selecting means and said slots and operable to indicate the presence of said articles in said slots, valve means operatively connected to said article selecting means and said slots, evacuating means operatively connected to said valve means and normally communicable with said article selecting means and said slots to secure by suction said articles received in said slots during movement of the article selecting means between said article storing means, atmosphere inlet means connected to said valve means and operable to destroy the vacuum within said article selecting means and in said slots, actuating means operatively connected to said pressure responsive means and rendered operative by the pressure responsive means when a full complement of articles is present in said slots as determined by the pressure responsive means, and operating means operatively connected to said valve means and said actuating means, said operating means being operable to cause operation of said valve means to admit air from said atmosphere inlet means to said article selecting means and said slots, thereby causing the release of said secured articles from the article selecting slots.

4. Apparatus comprising an article receiving means, a plurality of article storing means, a hollow article selecting means, drive means operatively connected to said article selecting means for moving the latter between said article storing means, said article selecting means being provided with a plurality of slots, each slot being adapted to receive an article from said article storing means during movement of the article selecting means therebetween, a pressure responsive means connected to said article selecting means and said slots and operable to indicate the presence of said articles in said slots, valve means operatively connected to said article selecting means and said slots, evacuating means operatively connected to said valve means and normally communicable with said article selecting means and said slots to secure by suction said articles received in said slots during movement of the article selecting means between said article storing means, atmosphere inlet means connected to said valve means and operable to destroy the vacuum within said article selecting means and in said slots, actuating means operatively connected to said pressure responsive means and rendered operative by the pressure responsive means when a full complement of articles is present in said slots as determined by the pressure responsive means, operating means operatively connected to said valve means and said actuating means, said operating means being operable to cause operation of said valve means to admit air from said atmosphere inlet means to said article selecting means and to said slots, thereby causing the release of said secured articles from said slots, and detecting means disposed adjacent said article receiving means and operatively connected to said operating means for detecting the presence of articles in said article receiving means prior to the release of said secured articles from said slots, said operating means being rendered inoperative by said detecting means when there are articles present in said article receiving means prior to the release of said secured articles from said slots, thereby preventing the release of said secured articles to said article receiving means.

5. Apparatus comprising an article receiving means, a plurality of article storing means, a hollow article selecting means, drive means operatively connected to said article selecting means for moving the latter between said article storing means, said article selecting means being provided with a plurality of slots for receiving articles from said article storing means during movement therebetween, a pressure responsive means connected to said article selecting means and said slots and operable to indicate the presence of said articles in said slots, valve means operatively connected to said article selecting means and said slots, evacuating means operatively connected to said valve means and normally communicable with said slots to secure by suction said articles received therein during movement of the article selecting means between said article storing means, atmosphere inlet means connected to said valve means and operable to destroy the vacuum within said article selecting means and in said slots, an operating relay activation circuit comprising a first relay and circuit closing means connected to said pressure responsive means and said first relay, said circuit-closing means being operable by said pressure responsive means when a full complement of articles is present in said slots as determined by the pressure responsive means to cause energization of said first relay, an article detecting circuit comprising a second relay and detecting means disposed adjacent said article receiving means and operatively connected to said second relay for detecting the presence of articles in said article receiving means prior to the release of said secured articles from said slots, said second relay being energized when there are articles present in the article receiving means, and an article delivery circuit comprising a normally closed contact of said second relay operatively connected to a normally open contact of said first relay, and operating means operatively connected to said valve means and said contacts, said operating means being operable upon closure of said contacts to cause operation of said valve means to admit air from said atmosphere inlet means to said article selecting means and to said slots, thereby causing the release of said secured articles therefrom and to said article receiving means.

References Cited in the file of this patent

UNITED STATES PATENTS

| | | |
|---|---|---|
| 785,932 | Baltzer et al. | Mar. 28, 1905 |
| 1,680,024 | Koerner | Aug. 7, 1928 |
| 1,801,119 | Soepnel et al. | Apr. 14, 1931 |
| 2,570,660 | Gamble | Oct. 9, 1951 |
| 2,618,480 | Williams | Nov. 18, 1952 |
| 2,683,538 | Kingston et al. | July 13, 1954 |
| 2,730,068 | Reynolds et al. | Jan. 10, 1956 |

FOREIGN PATENTS

| | | |
|---|---|---|
| 11,064 | Great Britain | 1911 |
| 1,046,640 | France | July 15, 1953 |